United States Patent [19]
Toda et al.

[11] Patent Number: 5,253,515
[45] Date of Patent: Oct. 19, 1993

[54] ATOMIC PROBE MICROSCOPE AND CANTILEVER UNIT FOR USE IN THE MICROSCOPE

[75] Inventors: Akitoshi Toda, Kunitachi; Shuzo Mishima, Hachioji, both of Japan

[73] Assignee: Olympus Optical Co., Ltd., Tokyo, Japan

[21] Appl. No.: 661,485

[22] Filed: Feb. 26, 1991

[30] Foreign Application Priority Data

Mar. 1, 1990 [JP] Japan .................................... 2-47296
Nov. 13, 1990 [JP] Japan .................................... 2-306804

[51] Int. Cl.$^5$ ........................ G01B 21/30; G01B 11/30
[52] U.S. Cl. ........................................ 73/105; 250/306
[58] Field of Search ........................ 73/104, 105, 866.5; 250/306, 307

[56] References Cited

U.S. PATENT DOCUMENTS

| | | | |
|---|---|---|---|
| 1,977,433 | 10/1934 | Dunning | 73/105 |
| 2,596,494 | 5/1952 | Lynch | 73/105 |
| 4,341,019 | 7/1982 | Possati | 73/105 |
| 4,943,719 | 7/1990 | Akamine et al. | 73/105 |
| 5,047,637 | 9/1991 | Toda | 73/105 |

FOREIGN PATENT DOCUMENTS

| | | |
|---|---|---|
| 0194323 | 9/1986 | European Pat. Off. |
| 0394962 | 10/1990 | European Pat. Off. |
| 62-130302 | 6/1987 | Japan |
| WO89/07258 | 8/1989 | World Int. Prop. O. |

OTHER PUBLICATIONS

J. Vac. Sci. Technol. A8(1), Jan.-Feb., 1990, T. R. Albrecht et al. article entitled "Microfabrication of Integrated Scanning Tunneling Microscope", pp. 317-318.
Physical Review Letters, vol. 49, No. 1, Jul. 5, 1982 Surface Studies by Scanning Tunneling Microscopy.
Atomic Resolution Imaging of a Nonconductor by Atomic Force Microscopy, vol. 62, No. 7, Oct. 1, 1987.

*Primary Examiner*—Tom Noland
*Attorney, Agent, or Firm*—Frishauf, Holtz, Goodman & Woodward

[57] ABSTRACT

An atomic probe microscope comprises a cantilever which includes a lever section provided with a probe, a lever attaching section for supporting the lever section, and a positioning striking section formed at the lever attaching section. A cantilever unit comprises a seat for supporting the cantilever and provided with a face against which the positioning striking section is received.

4 Claims, 14 Drawing Sheets

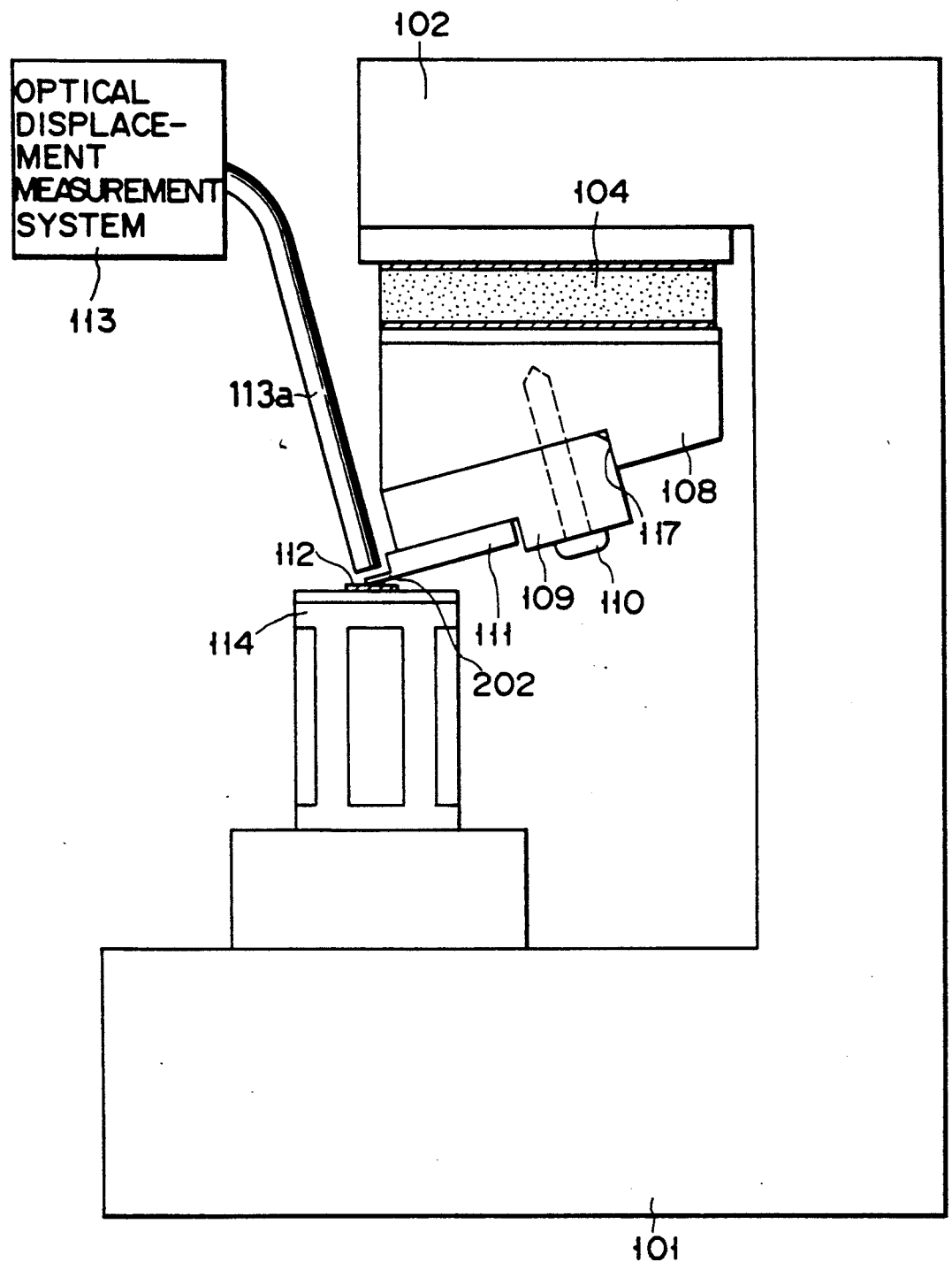
F I G. 1

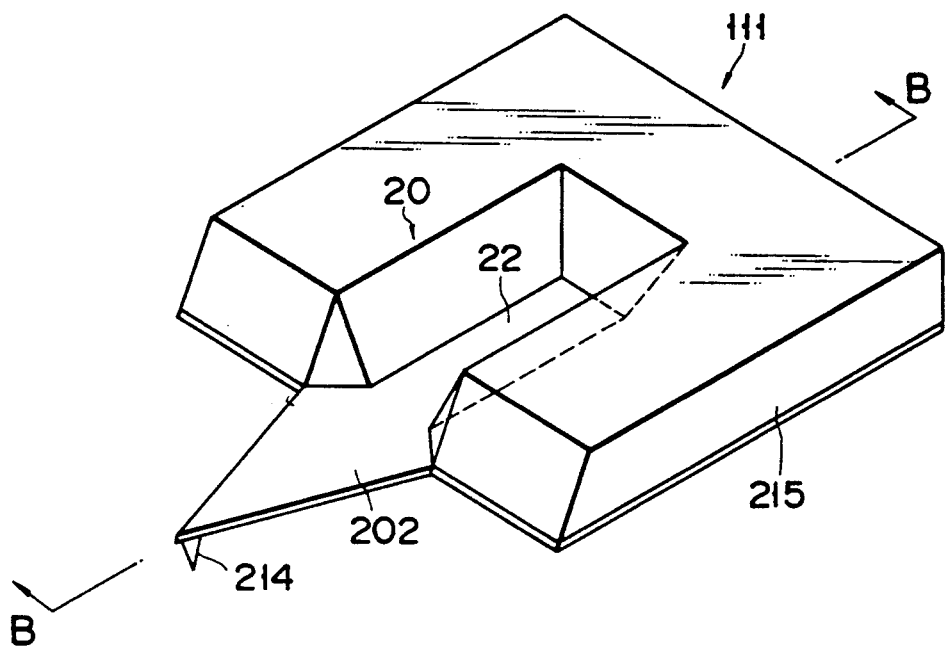
F I G. 13A
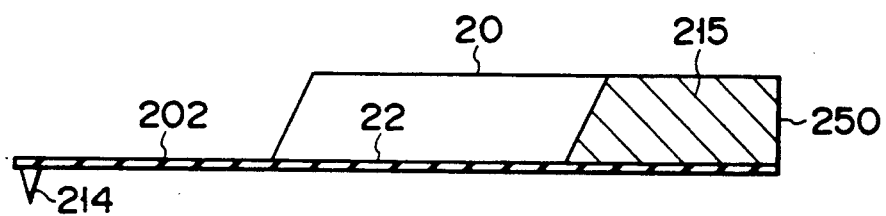
F I G. 13B

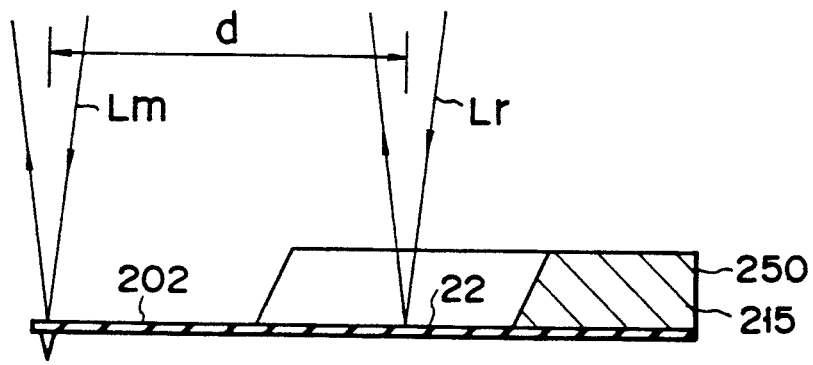
F I G. 14A
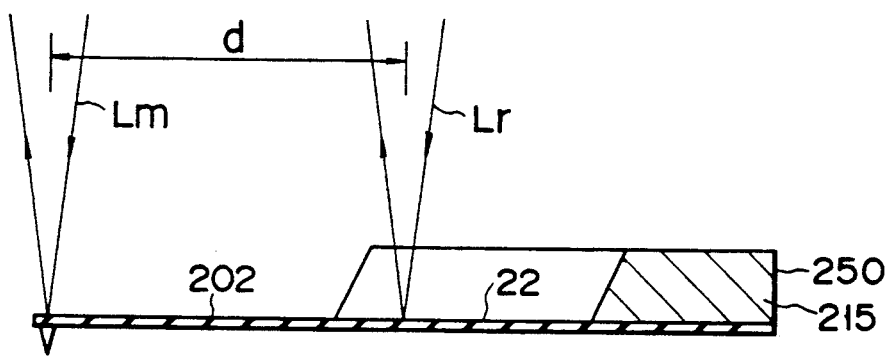
F I G. 14B
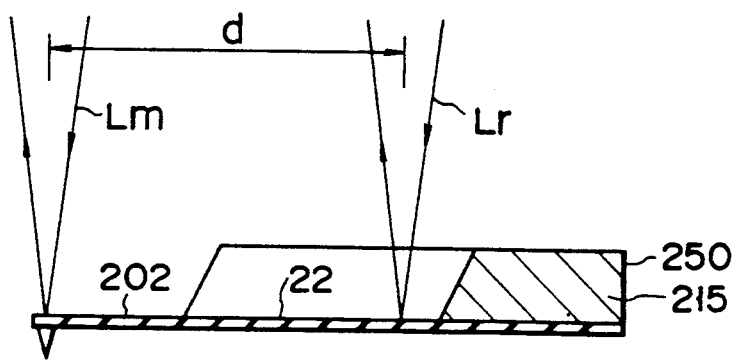
F I G. 14C

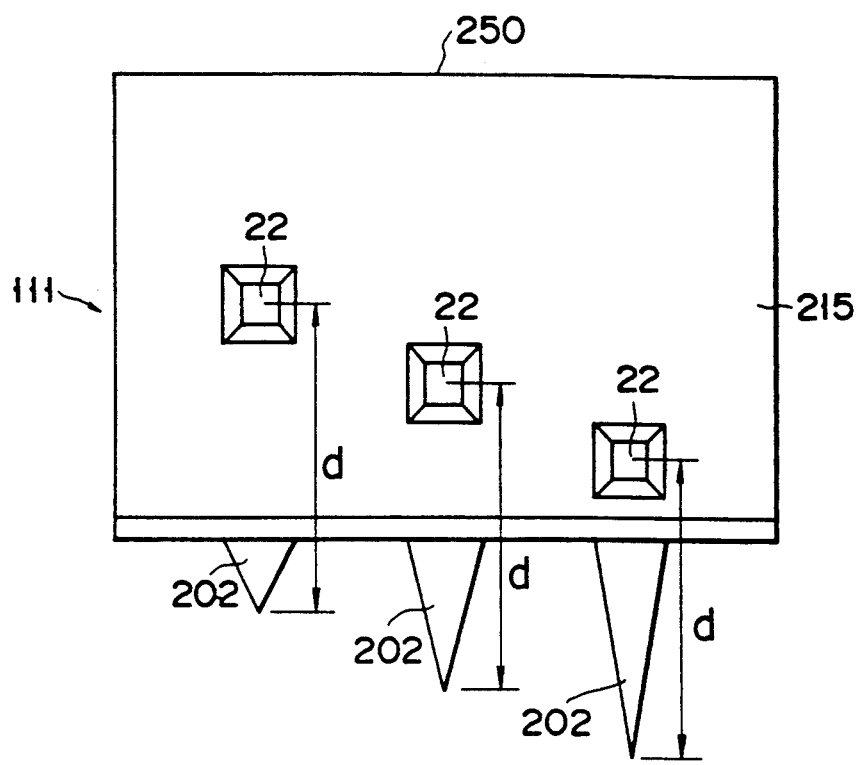
F I G. 15
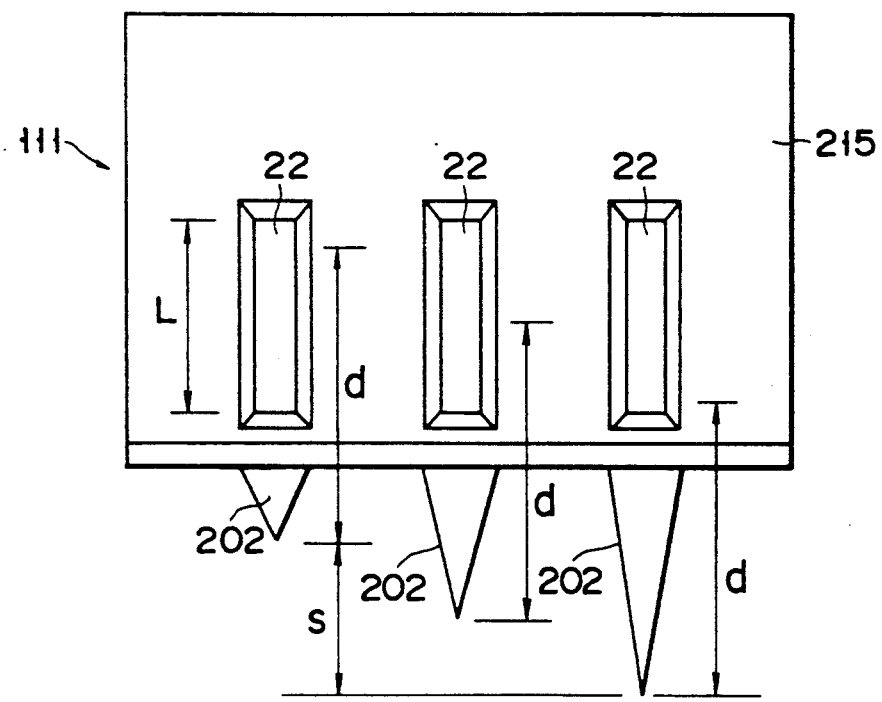
F I G. 16

ATOMIC PROBE MICROSCOPE AND CANTILEVER UNIT FOR USE IN THE MICROSCOPE

BACKGROUND OF THE INVENTION

1. Field of the Invention

The present invention relates to a cantilever unit for use in the atomic probe microscope and the like.

2. Description of the Related Art

The scanning tunneling microscope (STM) invented by Binning et al (G. Binning, H. Rohrer and E. Weibel: Surface Studies by Scanning Tunneling Microscope. Phys. Rev. Lett., 49 (1982) 57) has been more and more widely used in various fields as a microscope capable of viewing the unevenness of sample surface in the order of atoms.

A typical arrangement of the STM includes a probe and a system for scanning the probe in directions X and Y wherein tunnel current flowing between the probe and a sample is detected, while scanning the probe in the directions X and Y, to form the two-dimensional image of the sample.

However, the STM is designed to detect the tunnel current. Therefore, samples which can be viewed by the STM are limited to conductive ones, thereby making it impossible to view insulation materials through the STM.

The Japanese Patent Disclosure Sho 62-130302 discloses an atomic force microscope (AFM) capable of viewing insulation samples with an accuracy of atomic order.

The arrangement of the AFM is similar to that of the STM. When a cantilever provided with a sharp projection (or first probe) at the tip thereof is opposed to and located near a sample, interaction is created between atoms in the tip of the probe and those in the sample. When the positional relation of the probe and the sample is changed in the directions X and Y, the cantilever is displaced corresponding to the unevenness of the sample surface. This displacement of the cantilever is measured by a second STM system provided with a second probe which is arranged above the cantilever. Insulation materials which could not be viewed by the STM can be thus indirectly measured.

Further, T. R. Albrecht et al reported on a microcantilever for use with the AFM which was made using the anisotropic etching of silicon (T. R. Albrecht and C. F. Quate: Atomic Resolution Imaging of a Nonconductor by Atomic Force Microscope. J. Appl. Phys., 62 (1987) 2599). The process of manufacturing semiconductor ICs is used to make this micro-cantilever. The cantilever thus made can therefore have a high accuracy of micron millimeter order and an extremely excellent reproductiveness.

In the case of the atomic probe microscopes such as the STM and the AFM, the probe is located extremely close to the sample. This sometimes causes the probe to be contacted with the sample, so that the probe can be deformed or the lever section for supporting the probe can be broken. Therefore, these microscopes must be used while exchanging the cantilever with a new one every time the above-mentioned problem is caused. In order to obtain data with excellent reproductiveness by using the new cantilever, it is important that the shape of the exchanged micro-cantilever corresponds to that of the cantilever perviously used.

Further, the accuracy of data measured by the AFM depends upon how accurately the micro-cantilever is positioned relative to the cantilever displacement measuring system which is supported on the body of the AFM as well as the accuracy of the exchanged micro-cantilever itself. When AFM is used, considering the necessity of exchanging the cantilever with a new one, therefore, the S/N of an image formed by the AFM is determined by how accurately the new micro-cantilever is attached to its original position.

It is important in atomic probe microscopes that the exchange of the micro-cantilever with new ones can be made simple and that the new micro-cantilever can be attached to its original position with high reproductiveness. This also determines whether or not the atomic probe microscopes can be easily used.

However, no means for easily and accurately attaching the micro-cantilever to its original position has been provided yet.

SUMMARY OF THE INVENTION

The object of the present invention is therefore to provide a cantilever unit capable of making easier the exchange of the micro-cantilever with a new one for the AFM and the like and accurately attaching the new micro-cantilever to its original position with a higher reproductiveness.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows a cantilever unit of the present invention attached to the AFM;

FIG. 2A is a plan view; FIG. 2B is a front view; and FIG. 2C is a side view;

FIG. 13A is a perspective view showing another type of the cantilever;

FIG. 13B is a sectional view taken along line B—B in FIG. 13A;

FIGS. 14A through 14C show the displacement measuring system in which the heterodyne method is applied to the cantilever shown in FIGS. 13A and 13B;

FIG. 15 shows a further type of cantilever;

FIG. 16 shows a still further type of cantilever;

FIGS. 19A and 19B show a sixth example of the cantilever unit having plural micro-cantilevers attached to a lever seat, in which FIG. 19A is a front view and FIG. 19B a bottom view.

DETAILED DESCRIPTION OF THE PREFERRED EMBODIMENTS

Figure 2A:
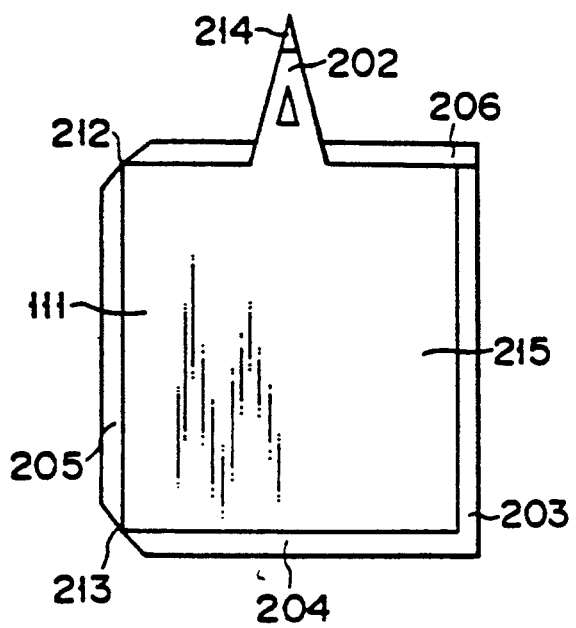
FIGS. 2A to 2C show a first example of the microcantilever according to the present invention used by the cantilever unit.

Some embodiments of the present invention will be described in detail with reference to the accompanying drawings.

FIG. 1 shows an arrangement of the AFM to which a cantilever unit of the present invention is attached. This AFM has a modulating piezoelectric element 104, a micro-cantilever 111 and others under a support arm 102 which is located, as a part of an AFM mirror body, on the side of the cantilever. A tube scanner 114 which can be micro-displaced in directions X, Y and Z is made operative and a sample 112 mounted on the tube scanner 114 is scanned by the micro-cantilever 111. The movement of the micro-cantilever 111 displaced corresponding to the unevenness of the sample 112 is caught by an optical displacement measurement system 113 in which an optical fiber 113a is included, and it is then data-processed. Namely, topographic information which reflects the uneven image of the sample is converted into image data and output-displayed on CRT. In FIG. 1, however, other components which form the optical displacement measurement system together with the optical fiber 113, the circuit for driving the tube scanner 114 and the micro-cantilever modulating piezoelectric element, and the processor device for creating the uneven image of the sample in response to the displacement of the micro-cantilever and the movement of the tube scanner are omitted and sizes of the components which form the arrangement of the AFM are neither enlarged nor reduced on a same scale but some of them are exaggerated for the sake of clearer understanding.

Conventionally, the micro-cantilever was made by mirco-processing a silicon wafer. When the silicon wafer was micro-processed in this manner, it had the possibility of its being broken because it was very thin, and the micro-cantilever could not therefore be attached to the cantilever support by a screw. This made it necessary to attach the micro-cantilever directly to the cantilever support arm by adhesive or the like.

According to the present invention, the micro-cantilever 111 is bonded to a lever seat 109, which is then attached to a chip seat 108 by a screw 110. As the result, it can be quite easy to exchange the micro-cantilever with a new one.

According to the present invention, it also aims at providing a system for enabling a new micro-cantilever to be attached to its original position with a higher accuracy after the old one was detached from the position. In order to achieve this object of the present invention in the case where the exchange of micro-cantilevers is made easy, as described above, by using the lever seat 109, it is required that the micro-cantilever be accurately attached to the lever seat 109 and that the lever seat 109 to be accurately attached to the chip seat 108. To achieve this purpose, the present invention uses the silicon micro-process, such as the anisotropic etching, which is used to make the micro-cantilevers in order to make the attaching of the micro-cantilever quite accurate. Namely, high positioning accuracy can be held at that portion of the micro-cantilever 111 which is attached to the lever seat 109, while introducing quite high manufacturing accuracy achieved by the lithographic technique.

Figure 2C:
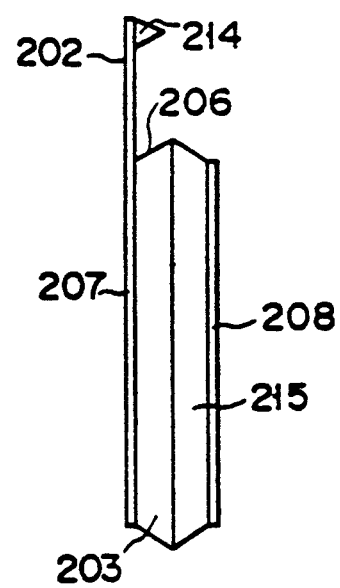
Figure 2B:
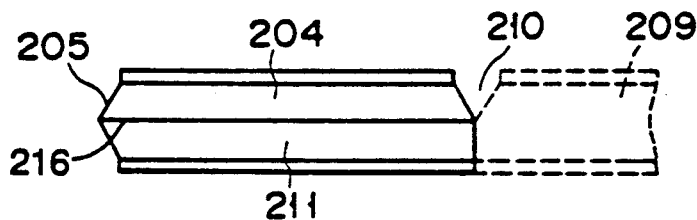
Figure 3:
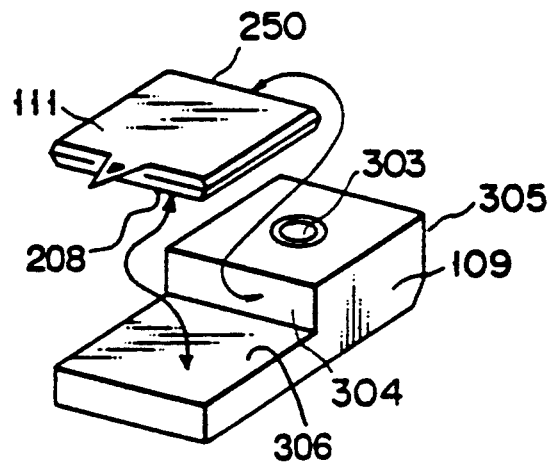
FIG. 3 shows a first example of the cantilever unit.

FIGS. 2A through 2C show a micro-cantilever used by the cantilever unit of the present invention and FIG. 3 shows the micro-cantilever to the lever seat to form the cantilever unit. The cantilever unit thus formed is attached to the chip seat 108 (see FIG. 1), using a hole 303 in the lever seat 109.

As shown in FIGS. 2A through 2C, the micro-cantilever 111 used by the cantilever unit of the present invention includes a lever attaching section (supporting block) 215, a lever section 202 projected from the lever attaching section 215, a probe 214 formed at the tip of the lever section 202, and faces 204, 205, 206 and 207 formed along edges of the lever attaching section 215. These faces are simultaneously exposed by the exposing process of photo-lithography at the time when the lever section 202 of the micro-cantilever 111 is made, and they are then etched. The positional relation of these faces relative to the lever section 202 can be held extremely high in accuracy by the photo-lithography.

As shown in FIG. 3, the lever seat 109 is provided with struck faces 304 and 306 against which the micro-cantilever 111 is struck. The supporting block 215 includes a first attachment section (faces 204 and 211 along an edge thereof) and a second attachment section (face 208 on the bottom thereof), which respectively come into contact with struck faces 304 and 306 of the lever seat 109. When the border ridge 216 between the faces 204 and 211 which are formed according to the above-described manner is struck against the face 304 of the lever seat 109 and bonded there by adhesive 250, the position of the lever section of the cantilever relative to the face 304 of the lever seat can be determined with extremely high accuracy.

Similarly, the chip seat 108 is also provided with a face 117 against which the lever seat 109 is struck (see FIG. 1). A face 305 of the lever seat is struck against the face 117 of the chip seat and the lever seat 109 is then fixed to the chip seat 108 by the screw 110. When the distance between the faces 304 and 305 of the lever seat 109 is accurately determined in this case, the relation between the tip of the micro-cantilever 111 and the face 117 of the chip seat can be kept certain at all times, thereby enabling the positioning of the micro-cantilever 111 to be attained with extremely high accuracy. In addition, this can be achieved by the simple process of striking the micro-cantilever against the lever seat and the lever seat against the chip seat and bonding the micro-cantilever 111 to the lever seat 109 and fixing the lever seat 109 to the chip seat 108 by the screw or the flat spring.

The micro-cantilever used by the present invention is made typically of a single crystal material such as silicon, one of its compounds, compounds crystal such as $G_2As$ or the like, light sensitive glass, or metal foil. Silicon is a material most often used as the material of which semiconductor ICs are made, and it is therefore particularly preferable to use silicon in the present invention because the process of manufacturing semiconductor ICs by silicon has reached a quite high level. Silicon oxide, silicon nitride and others are also preferable as compounds of silicon. The term "starting material" used in the claims appended hereto represents a material which becomes a base when such measures in the semiconductors making process as etching, coating, vaporing and depositing are applied to some material to make parts of some shape.

When the striking face is to be formed on the micro-cantilever used by the present invention, it may be arranged that the micro-cantilever is cut by a tool such as the dicing saw and the laser cutter and that the face of the micro-cantilever thus cut is used as the striking face. When the lithography techniques are used, however, the shape of the micro-cantilever can be more freely selected. The lithography techniques are more preferable to make the micro-cantilevers. If the striking or struck face is made by the lithography techniques at the same time as the micro-cantilever is made, it is preferable because the number of processes used can be reduced together with the reduction of the cost. Further, the lithography techniques enable the tip of the micro-cantilever to be positioned relative to the striking face thereof with extremely high accuracy. It is therefore preferable to use the lithography techniques to make the micro-cantilevers of the present invention.

When the micro-cantilever used by the present invention is to be made using the photolithography which is one of the lithography techniques, a, large number of the micro-cantilevers which are quite the same in shape at an accuracy in the order of micron millimeters can be made if the final positioning of the lever section relative to the striking face is determined by exposing the same mask patterns.

When the micro-cantilever is to be made from a silicon wafer, using the lithography techniques, both the top and underside of the silicon wafer are etched. When the micro-cantilever is pulled out of the silicon wafer, mask patterns on the top and underside of the silicon wafer are accurately aligned with each other. This enables the positioning of the lever section relative to the striking face to be made with high accuracy. The lithography using electron beam exposure is also suitable for making the micro-cantilevers used by the present invention.

Metal, glass, ceramics or plastics are used to make the lever and chip seats. Particularly, the parts of the atomic probe microscope must have an accuracy of atomic order and the thermal expansion of small parts has the possibility of affecting data obtained. In order to make the lever and chip seats, therefore, material having high rigidity and a small coefficient of thermal expansion is selected. Single crystal material such as silicon can also be used.

It is important to form the striking or struck face on these seats with high accuracy. This makes it preferable to use the lithography techniques. Metal and the like, however, can be processed at an accuracy less than 10 um by the numerical control (NC) machine. Therefore, the conventional manner of processing mechanical parts by the NC machine is also preferable in addition to the lithography techniques.

It will be described how the micro-cantilever used by the present invention is made.

Figure 4:
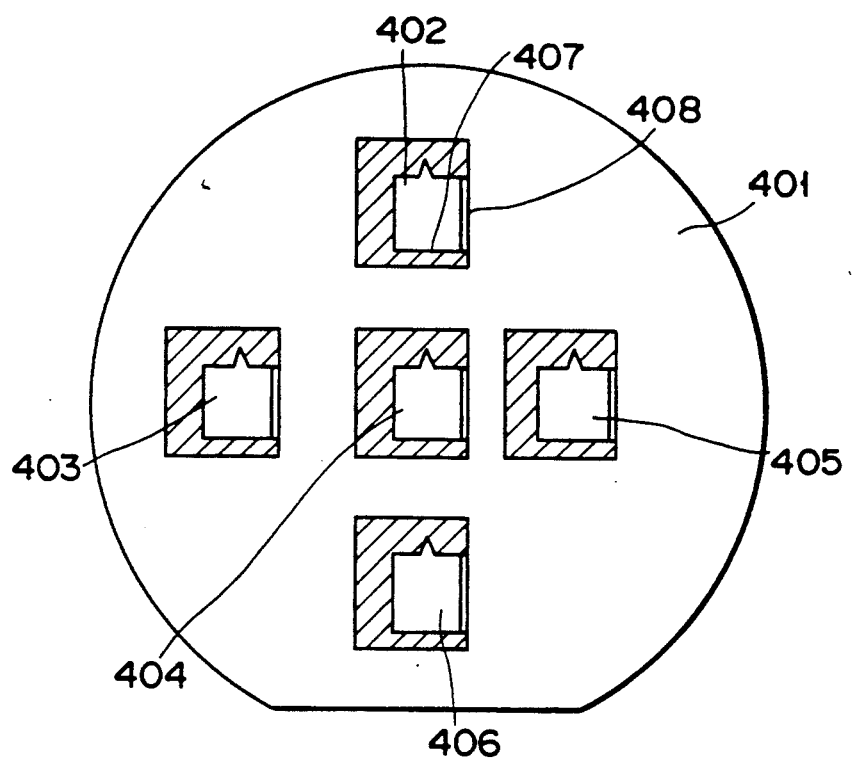
FIG. 4 shows the micro-cantilevers in FIG. 2 etched from a silicon wafer.

Silicon oxide films each having a thickness of 1.5 um were formed on both faces of a silicon wafer, which had a face orientation (100) and a thickness of 400 um, according to the thermal oxidation process and plural micro-cantilever (402–406) were made on a sheet of the silicon wafer 401, as shown in FIG. 4, after the photolithography process including a resist coating, exposure and wet anisotropic etching according to KOH was applied to the films. Hatched portions in FIG. 4 represent that the wafer was etched through. Each of the micro-cantilevers finally picked up from the wafer is as shown in FIGS. 2A through 2C. The size of each of the micro-cantilevers is about 5 mm×5 mm. The lever section has a size of 200 um extending from the top to the base thereof and a width of 120 um at the base thereof. As shown in FIG. 4, the micro-cantilever 402, for example, is connected to the silicon wafer 401 by a portion 408. Its state is as shown by the front view in FIG. 2B. The portion 408 shown in FIG. 4 corresponds to a groove 210 shown in FIG. 2B and etching does not advance from this portion 408. When the silicon wafer has a groove like this, it can be easily bent along the groove to release the micro-cantilever from it. That portion of the silicon wafer which is bent and released from the micro-cantilever is shown by broken lines 209 in FIG. 2B.

When the micro-cantilever is incorporated into the AFM device, the displacement of the micro-cantilever is measured by an optical displacement meter. A film of chromium, 10 nm, and another film of gold, 200 nm, were formed on the micro-cantilevers to increase the reflection factor of probe light before the micro-cantilevers were cut off from the silicon wafer. Chromium and gold were vapored on both faces of the silicon wafer while rotating the silicon wafer, thereby preventing the micro-cantilevers from being bent backward by the films of chromium and gold. The face 407 of each of the micro-cantilevers cut off from the silicon wafer and shown in FIG. 4, that is, the face corresponding to the faces 204 and 211 shown in FIG. 2B was etched clear or beautiful.

The micro-cantilever thus made wa attached to the lever seat which was made by processing the "Superinver" (trade name and made by Sumitomo Kinzoku Corporation) by the NC machine, thereby making a chip. When the dimension accuracy of the chip was measured by the photomacrographic projector, the accuracy of 10 um which was made possible by the NC machine could be realized relating to the chip.

The chip was positioned while being struck, against the chip seat, which was made by the Superinver, and fixed to the chip seat by a screw and then attached to the AFM device. The chip thus attached was exchanged by another one and this exchange was made extremely easy while positioning the chip with high accuracy.

FIGS. 5 through 8 show another example of the cantilever unit which uses the micro-cantilever made by similar etching and provided with the striking face. The silicon wafer used exposes (100) face and in a case where wet anisotropic etching such as KOH is applied to this wafer, the etching advances at an angle of about 54 degrees so as to expose (111) face, as seen in the front and side views shown in FIGS. 2B and 2C. Such detailed portions are omitted in FIGS. 5 through 8 and the ridge at the border of the striking faces will be hereinafter referred to as striking section.

Figure 5:
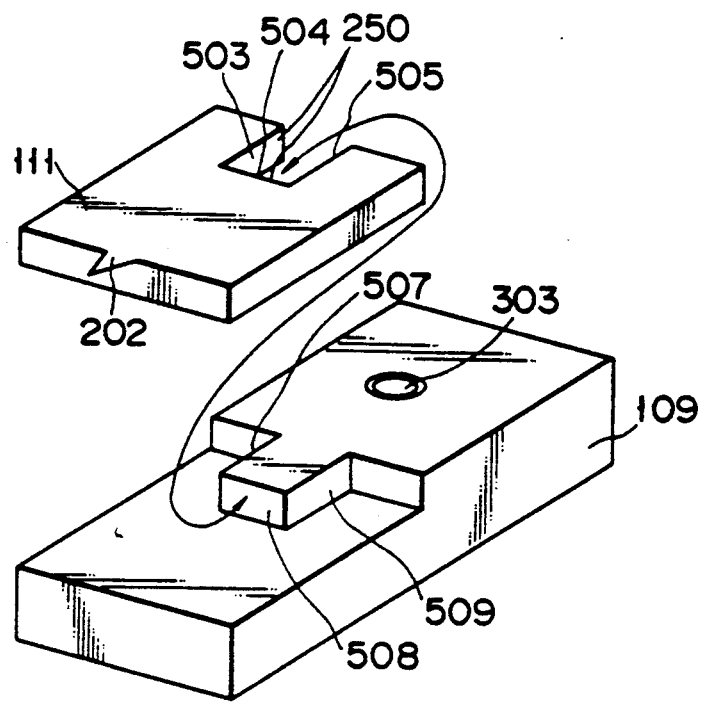
FIG. 5 shows a second example of the cantilever unit.

The cantilever unit shown in FIG. 5 is improved in that the positioning accuracy of the micro-cantilever shown in FIG. 3 is worse in the width direction than in the length direction. The side of the micro-cantilever 111 which is opposed to its lever section 202 is cut off like a square at the center portion thereof to form striking sections 503, 504 and 505. On the other hand, the lever seat 109 is provided with struck faces 507, 508 and 509 in such a way that these struck faces can fit the striking sections 503, 504 and 505 of the micro-cantilever 111. The micro-cantilever 111 is therefore fixed to the lever seat 109 in such a way that the striking sections fit the struck faces and bond them by adhesive 250. Because the striking section 503 is struck against the struck face 507 and the striking section 505 is struck against the struck face 509, the micro-cantilever 111 can be prevented from shifting in the horizontal or transverse direction, thereby enabling a higher micro-cantilever attaching accuracy to be realized. These striking sections 503, 504 and 505 of the micro-cantilever cannot be made by the dicing saw or the like. The anisotropic etching of the silicon wafer is therefore used for this purpose. Namely, each of the striking sections of the micro-cantilever 111 is made while keeping the face direction of the silicon wafer (100) and using a difference in etching speed in the (111) face direction and another face direction.

The micro-cantilever shown in FIG. 2A is etched in such a manner that each of two corners denoted by 212 and 213 is not formed like a right angle, and the positioning accuracy of the micro-cantilever is thus made inferior in the traverse direction. When a groove is formed by cutting the chip inward as seen in FIG. 5, a higher positioning accuracy can be realized.

Figure 6:
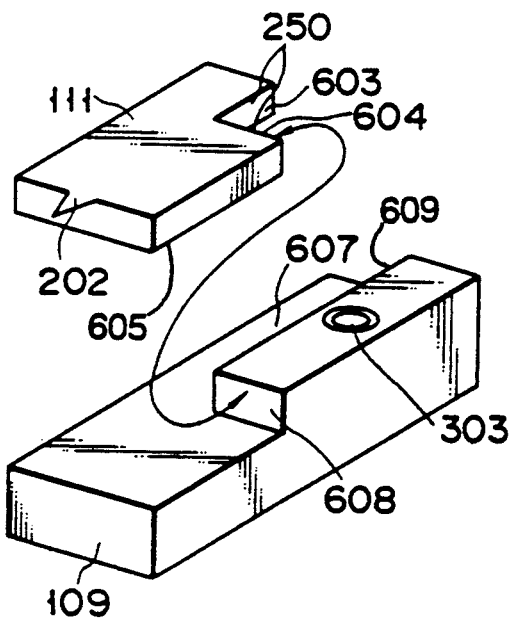
FIG. 6 shows a third example of the cantilever unit.

FIG. 6 shows a further example of the micro-cantilever 111 whose size is made smaller. That side of the micro-cantilever 111 which is opposed to its lever section 202 is cut off at a right angle to form striking sections 603 and 604, in addition to striking section 605. When the size of the micro-cantilever is made small like this, a larger number of the micro-cantilevers can be formed from a silicon wafer, thereby making the cost of a micro-cantilever lower. Further, each of those components of the AFM device which are related to the attaching of the micro-cantilever to the device can be made smaller in size, too. In a case where the sample 112 is measured by the AFM device shown in FIG. 1, for example, while using the cantilever modulating piezoelectric element 104 and vibrating the micro-cantilever 111, those components of the device which add vibration to the micro-cantilever 111 can be made lighter in weight. This is quite desirable for the device of this type which is intended to make measurement while reducing vibration noise to as great an extent as possible. Needless to say, this micro-cantilever enables its attaching to be realized with a higher accuracy because it can be prevented from shifting in the traverse direction when its striking sections 603, 604 and 605 are respectively struck against the faces 609, 608 and 607 of lever seat 109 and bonded there by adhesive 250.

Figure 7:
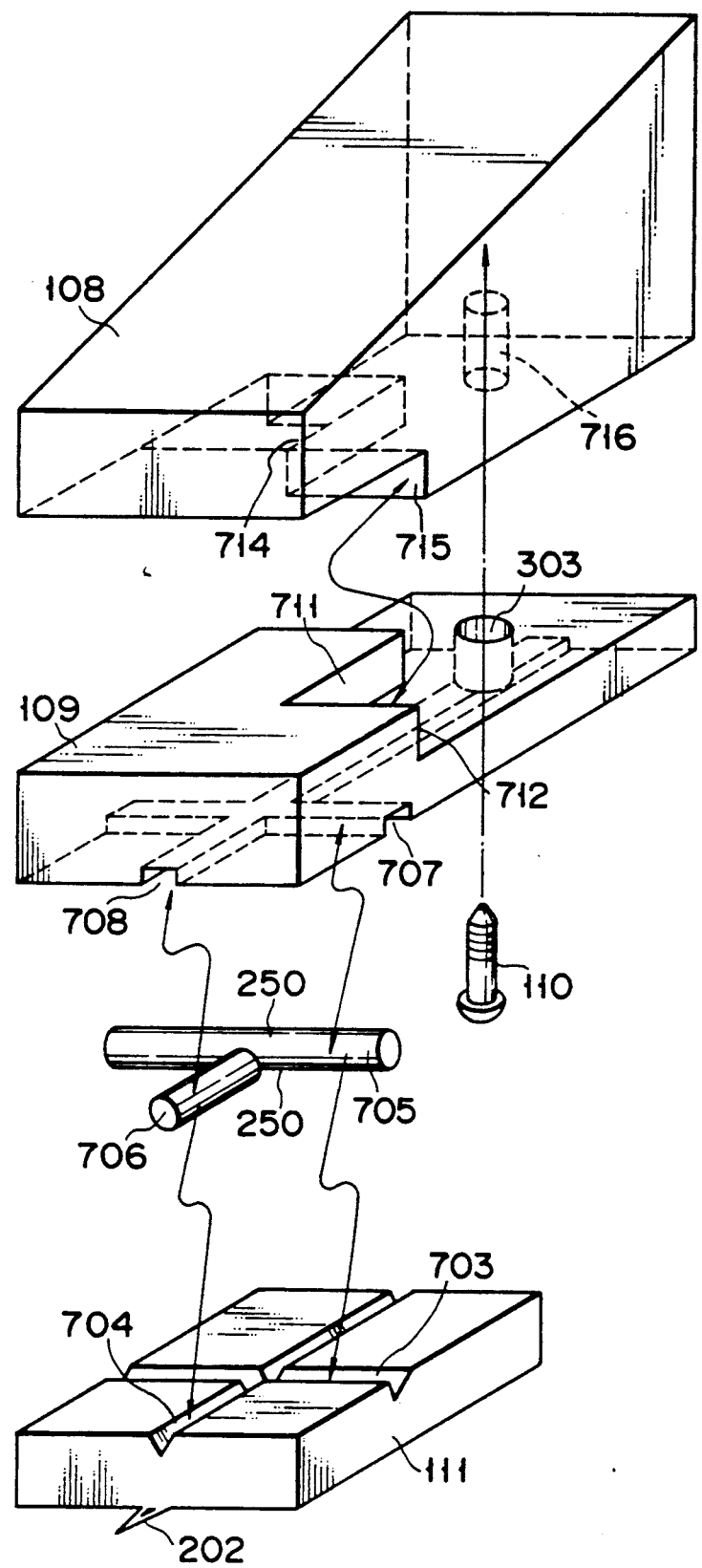
FIG. 7 shows a fourth example of the cantilever unit.

FIG. 7 shows a means for creating a high positioning accuracy by using positioning rods 705 and 706 made of optical fibers or the like. As seen in the above-described embodiments of the present invention, this embodiment is also intended to realize high positioning accuracy on the basis of the striking conception.

Using an etching technique, cross-shaped grooves 703 and 704 are formed on that face of the micro-cantilever 111 which is opposed to the other face of the micro-cantilever 111 along which the lever section 202 extends. These grooves and the lever section 202 are positioned with an extremely high accuracy according to the lithographic technique. The positioning rods 705 and 706 are seated in the grooves and bonded there by adhesive 250. These positioning rods are struck against inner faces of the V-shaped grooves made by etching and they are positioned there with accuracy. Each of the positioning rods 705 and 706 has such a diameter in this case that enables them to be bonded in the grooves 703 and 704 while not being completely embedded therein but projected a little upward from the face of the micro-cantilever 111 in order to accurately position the micro-cantilever 111 and the lever seat 109. Positioning grooves 707 and 708 into which the positioning rods 705 and 706 are fitted are formed on that face of the lever seat 109 to which the micro-cantilever is attached. Positions and shapes of these grooves 707 and 708 are previously positioned with accuracy The positioning rods bonded to the micro-cantilever 111 are fitted into the grooves 707 and 708 of the lever seat 109 and bonded there, so that the tip of the lever section 202 of the micro-cantilever and the lever seat 109 can be accurately positioned. The chip thus made can create original positioning accuracy again at the time when the micro-cantilever is exchanged with a new one.

The lever seat 109 is provided with striking faces 711 and 712 which form a right angle and the chip seat 108 is also provided with struck faces 714 and 715 which fit the striking faces 711 and 712 of the lever seat 109. The screw hole 303 is formed in the lever seat 109 and when the striking face 711 is struck against the struck face 714 and the striking face 712 against the struck face 715, that portion of the chip seat which corresponds to the screw hole 303 of the lever seat 109 is provided with a screw hole 716. The lever seat 109 is fixed to the chip seat 108 in such a way that the striking faces 711 and 712 of the lever seat 109 are struck against the struck faces 714 and 715 of the chip seat 108 and that the screw 110 is screwed into the screw holes 303 and 716. The striking and struck faces and the screw holes are previously and so accurately positioned as to enable the lever and chip seats 109 and 108 to be accurately positioned. When arranged as described above, an extremely simple exchange of chips can be realized.

Figure 8:
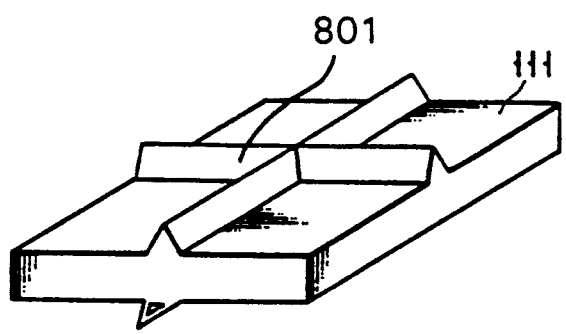
FIG. 8 shows a micro-cantilever used in a fifth example of the cantilever unit.

FIG. 8 shows an example of the micro-cantilever which is provided with a cross-shaped positioning guide 801 formed using the anisotropic etching of silicon. This example enables the number of parts used and the cost to be made smaller and lower than in the case where fibers and the like are used.

A micro-cantilever which is suitable for the optical displacement measuring manner which is called the heterodyne method can be used in the cantilever unit of the present invention. Some of the cantilevers which are suitable for the heterodyne method will be described in detail with reference to FIGS. 9 through 18. The micro-cantilevers which will be described below have an extremely high positioning accuracy realized by the lithography techniques, as seen in the cases of the micro-cantilevers shown in FIGS. 2A through 3. The striking section which is a ridge is also formed at the lever attaching section 215 according to the lithography techniques, as described above relating to the micro-cantilevers, and a detailed description on this section is omitted. Further, the micro-cantilevers which will be described below are fixed to the lever seat by adhesive 250, as seen in the case of the micro-cantilever shown in FIG. 3, and a detailed description on this fixing of the cantilever is omitted.

Figure 9A:
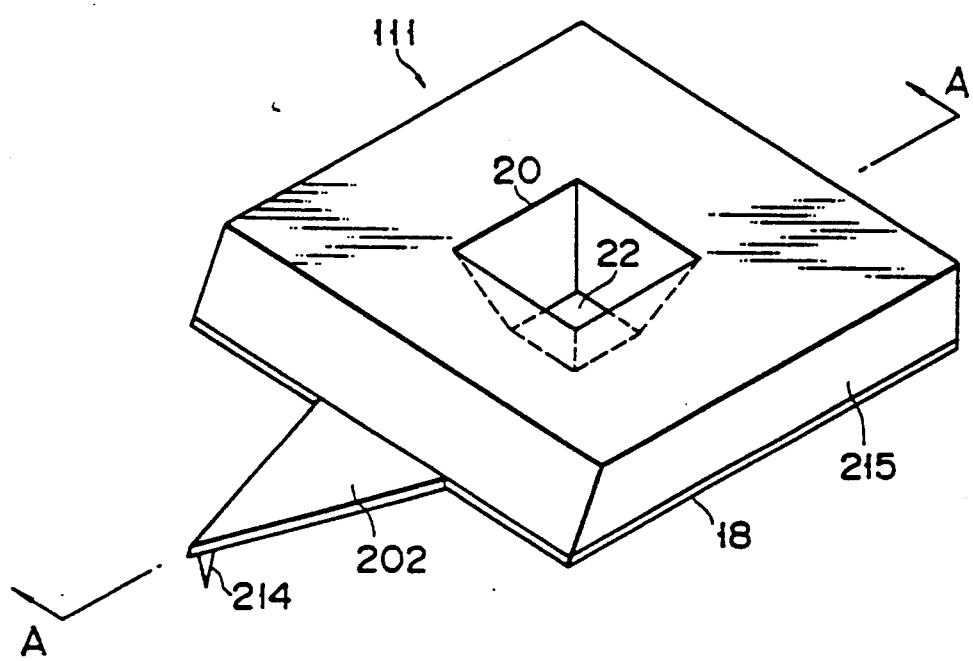
FIG. 9A is a perspective view showing an example of the cantilever used in the first example of the cantilever unit and suitable for the heterodyne method.
Figure 9B:
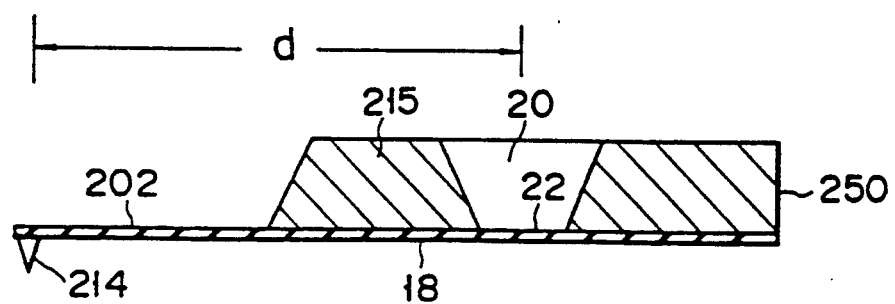
FIG. 9B is a sectional view taken along line A—A in FIG. 9A.

FIG. 9A is a perspective view showing a micro-cantilever suitable for the heterodyne method and FIG. 9B is a sectional view taken along a line A—A in FIG. 9A. The micro-cantilever 111 includes the triangular lever section 202 which has the probe 214 at the tip of its triangular section, and the plate-like lever attaching section 215 which supports the lever section 202. A fixing section 18 which is made integral to the lever section 202 is fixed to the underside of the lever attaching section 215. A square opening 20 is formed at the lever attaching section 215 and a reference section 22 which is a part of the fixing section 18 is exposed at the opening 20. The opening 20 is formed at such a position that the distance between the tip of the lever section 202 and the center of the reference section 22 becomes equal to the interval (d) between beams of the displacement measuring system in the case of the heterodyne method. Since the lever attaching section 215 has the square opening 20, the micro-cantilever is useful, particularly in the heterodyne method wherein the beam intervals d cannot be altered.

Figure 10A:
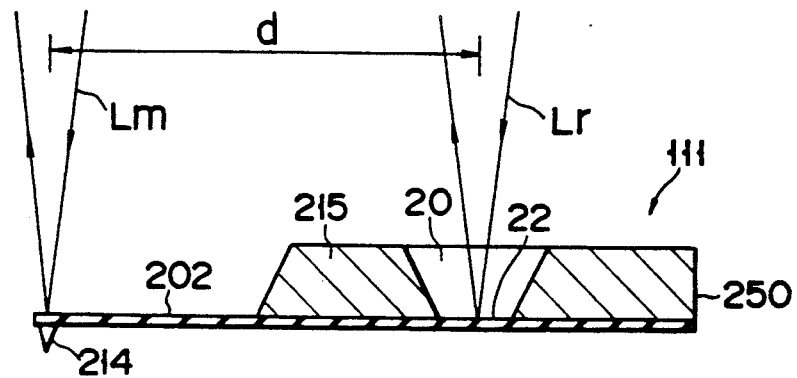
FIGS. 10A through 10C show the displacement measuring system in which the heterodyne method is applied to the cantilever shown in FIGS. 9A and 9B.
Figure 10B:
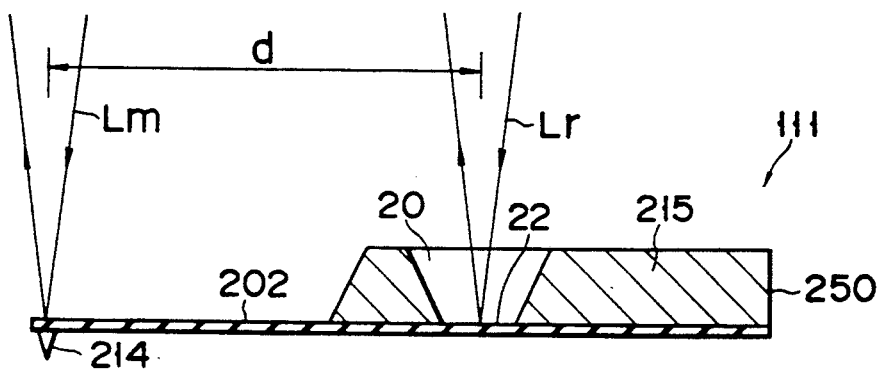
Figure 10C:
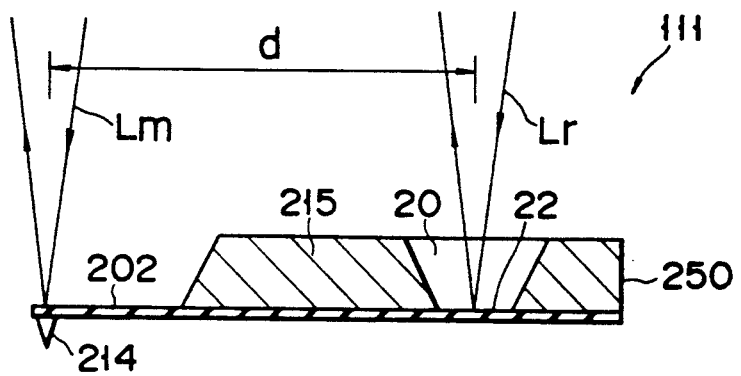

FIGS. 10A through 10C show the micro-cantilevers 111 which have three kinds of lever sections 202, different in length, and to which the displacement measuring system is applied according to the heterodyne method.

The opening 20 is formed in the case of each of these micro-cantilevers 111 in such a way that the distance between the tip of the lever section 202 and the center of the reference section 22 is kept equal to the certain interval (d) at all times however different the length of each of the lever section 202 may be. When reference light beam Lr is shot onto the reference section 22, therefore, measuring light beam Lm can be ideally radiated onto the tip of the lever section 202 in any case. This makes it unnecessary to adjust the displacement measuring system in the case where the micro-cantilever is exchanged with another one having a different spring constant, depending upon a sample measured.

Figure 11A:
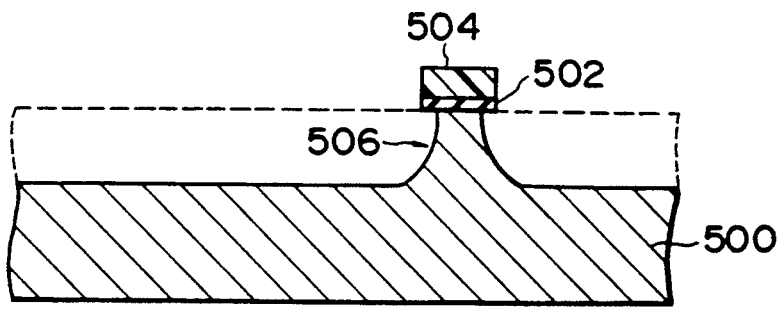
FIGS. 11A through 11D are intended to explain a method by which the cantilever shown in FIGS. 9A and 9B is made.
Figure 11B:
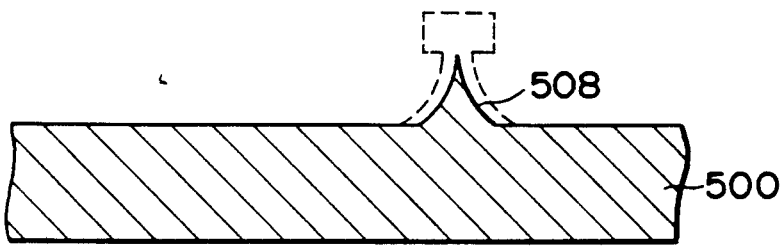
Figure 11C:
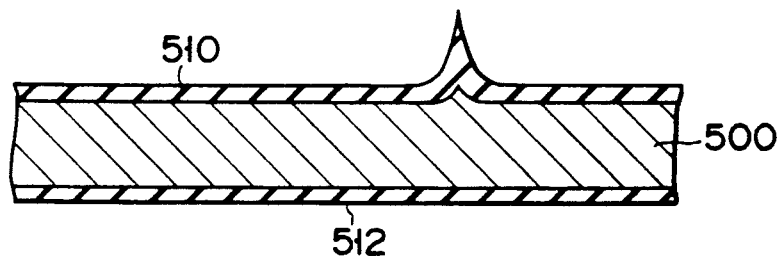
Figure 11D:
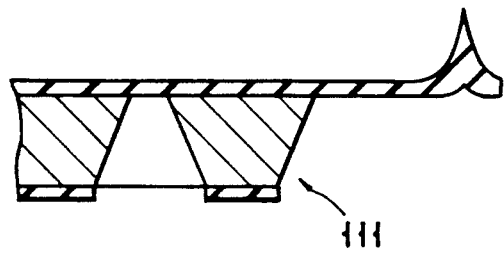

These cantilevers 111 can be made using the process of manufacturing semiconductor ICs. Applicants practically made the cantilever shown in FIGS. 9A and 9B. The making method will be described referring to FIGS. 11A through 11D. An Si wafer 500 ((100) face) was washed clean and an $SiO_2$ film 502, 100 nm thick, was then formed on the Si wafer 500 by thermal oxidation. The film 502 was coated with resist material 504 and then exposed in a circle of 5 um$\phi$, which serves as a probe pattern, by the mask aligner. After the developing process, the $SiO_2$ film 502 and the Si wafer 500 were etched, using the remaining resist material 504 as a mask, according to the anisotropic plasma etching which used SF6 and ClF5 as etching gases (FIG. 11A). An Si post 506 thus left was a little tilted because of the resist material 504 present. The resist material 504 and the $SiO_2$ film 502 were then removed and the plasma etching was further applied to the Si wafer 500. As a result, a projection 508 having a sharp tip was formed on the Si wafer 500, as shown in FIG. 11B. $SiO_2$ films 510 and 512 each having a thickness of 1.5 um were formed on the top and bottom of the Si wafer 500, as shown in FIG. 11C. The $SiO_2$ film 512 on the bottom of the wafer 500 was coated with resist material and a pattern for forming the cantilever section and the opening was then formed by lithography. Using this pattern as a mask, that area of the $SiO_2$ film 512 which was not masked was etched by the anisotropic etching of Si in which solution of potassium hydroxide was used, until the $SiO_2$ film on the top of the wafer 500 was exposed. As a result, the micro-cantilever 111 was made as shown in FIG. 11D. The opening was formed as a square having a side of 250 um.

The material of which the lever section 202 and the reference section 22 are made is $SiO_2$ in the case of the micro-cantilever 111 thus made and both of them have an equal reflection factor accordingly. This makes it unnecessary to add any correction to the amount of light reflected when light beams are shot onto both of them. Needless to say, light reflective metal film made of gold, for example, may be applied to both of them to enhance the S/N ratio of the displacement measuring system.

Figure 12:
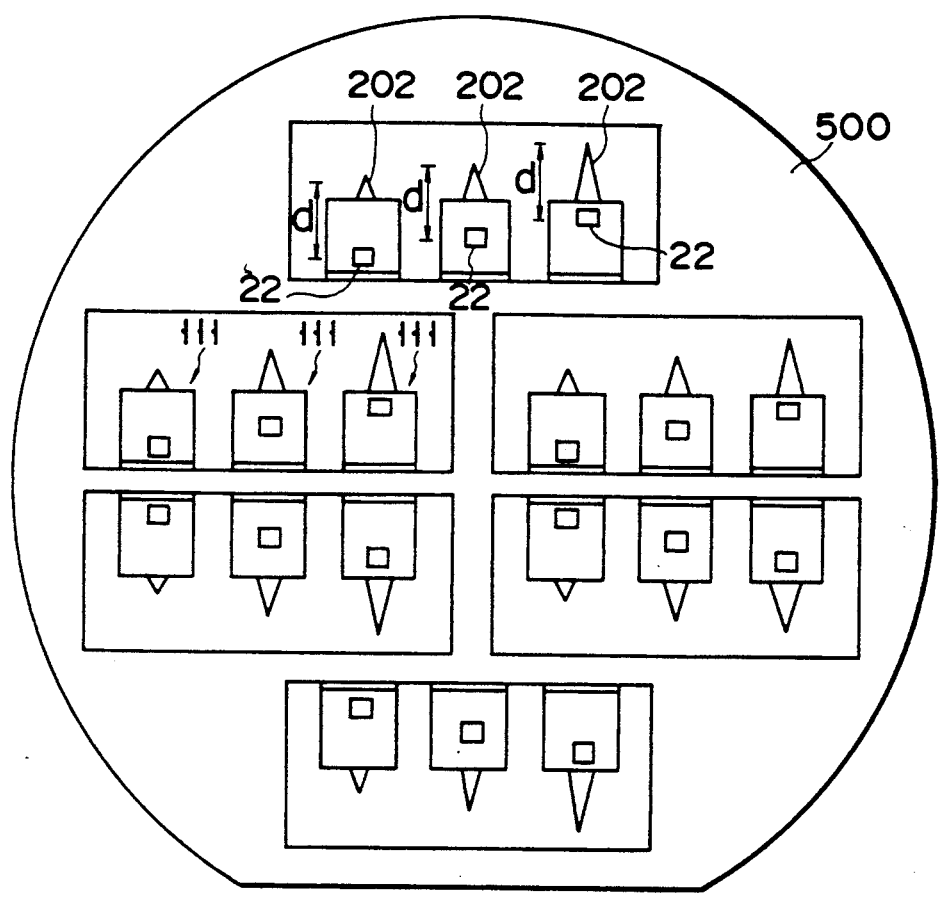
FIG. 12 shows plural cantilevers one of which is shown in FIGS. 9A and 9B formed on a sheet of Si wafer.

In the case where the cantilever is made from the Si wafer, using the semiconductor IC process as described above, one kind of cantilever may be made from one sheet of Si wafer. As shown in FIG. 12, however, several kinds of the micro-cantilevers 111 whose lever sections 202 are different in length can be made at the same time from a sheet of the Si wafer 500. It is not needed in this case that the number of exposing masks prepared corresponds to that of lever sections which are different in length. FIG. 12 is a plan view showing 18 units of the micro-cantilevers 111 having three kinds of lever sections 202 different in length and made from the Si wafer 500. The length of each lever section 202 and the position of each reference section 22 do not reflect their practical length and position in FIG. 12, but the distance between the tip of the lever section 202 and the center of the reference section 22 is kept equal to the constant value (d) at all times in each of the cantilevers 111.

A micro-cantilever of the other type will be described with reference to FIGS. 13A and 13B. FIG. 13A is a perspective view showing the cantilever and FIG. 13B is a sectional view taken along a line B—B in FIG. 13A. This micro-cantilever, 111 is the same as the above-described ones except for the shape of the opening 20 formed at the lever attaching section 215. The opening 20 in this case is formed not square but open toward the lever section 202. Therefore, the reference section 22 is formed continuous to the top of the lever section 202. It is preferable that the width of the opening 20 is smaller than that of the fixed end of the lever section 202 because the vibration mode of the lever section 202 is made as similar as possible to that of the ideal cantilever shown in FIG. 9A.

FIGS. 14A through 14C show the micro-cantilevers 111 which have three kinds of the lever sections 202, different in length, and to which the displacement measuring system is applied according to the heterodyne method. As seen in the above-described micro-cantilevers, the measuring light beam Lm and the reference light beam Lr are ideally shot onto the tip of the lever section 202 and the reference section, respectively. This makes it unnecessary to adjust the displacement measuring system when the micro-cantilever is exchanged with another one which has characteristics different from those of the former.

This micro-cantilever 111 was made in the same manner as in the case of the cantilever shown in FIGS. 11A through 11D. However, it was different in that the mask for the reference section 22 was left open toward the micro-cantilever when the lever section 202 and the reference section 22 were patterned by lithography at the final process. As a result, the fixed end of the lever section 202 was not shaped like a sharp right angle, but the opening became wider as it came nearer the lever section 202, because of the Si anisotropic etching in which potassium hydroxide solution was used. However, the cantilever thus made was suitable for the displacement measuring system according to the heterodyne method.

A still further micro-cantilever is shown in FIG. 15. In the case of this micro-cantilever 111, three lever sections 202, different in length, are arranged at a lever attaching section 215. When attention is paid to the lever and reference sections 202 and 22 of one unit, their arrangement is the same as that of the micro-cantilever shown in FIG. 9A and the distance between the tip of the lever section 202 and the center of the reference section 22 is made equal to the certain distance (d) in any case of the units. As shown in FIGS. 10A through 10C, therefore, the measuring and reference light beams Lm and Lr are shot onto the tip of the lever section 202 and the center of the reference section 22 and the displacement measuring system can be employed according to the heterodyne method without adjusting the displacement measuring system. The lever section 202 needed is used at the time of measurement after the other ones are removed.

The micro-cantilever 111 provided with three lever sections 202 whose lengths were 80 um, 120 um and 160 um was made by the same manner as shown in FIGS. 11A through 11D. The distance (d) extending from the tip of the lever section 202 to the center of the reference section 22 was made 800 um and the size of the reference section 22 was made 200 um. Those lever sections 202 which were not used at the time of measurement were bent and removed not to disturb the scanning. The micro-cantilever thus made was suitable for the probe micro-scope of the scanning type into which the displacement measuring system according to the heterodyne method was incorporated.

A still further micro-cantilever is shown in FIG. 16. The reference section 22 is formed like an elongated rectangle and its long side L is made longer than the difference S between the longest lever section and the shortest one. This enables each of the lever sections 202 to have the distance (d) between the tip of the lever section 202 and the reference section 22.

Figure 17A:
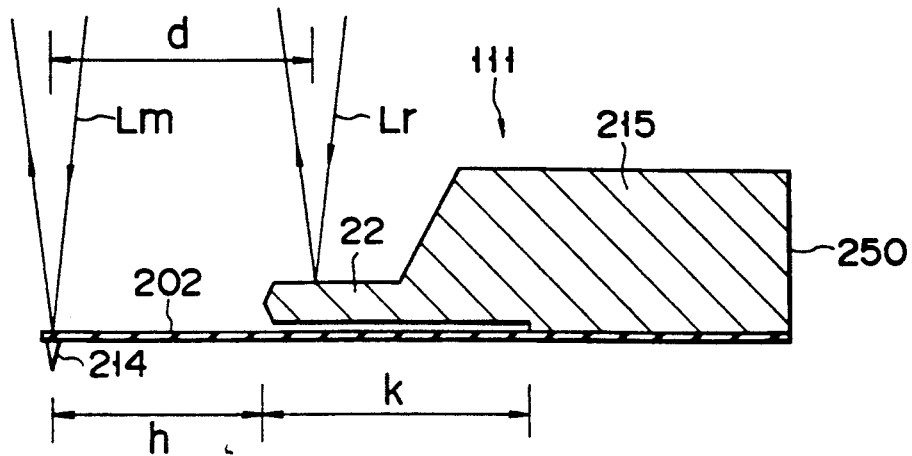
FIGS. 17A and 17B show a still further type of cantilever.

A still further micro-cantilever is shown in FIG. 17A. It is desirable that the reference section is strong against mechanical vibration applied from outside. The vibration of the reference section is allowable if it is so small as not to disturb the displacement detection conducted by the displacement measuring system, and the smaller the better. It is effective for this purpose that the thickness of the reference section is increased to set the mechanical resonance frequency of the reference section 22 at the side of high frequency. The cantilever 111 in this case is made on the basis of this conception and the reference section 22 is projected integral from the lever attaching section 215 so as to cover a part of the lever section 202. The reference section 22 is made thicker than the lever section 202 and its mechanical resonance frequency is set higher than that of the lever section 202. The reference section 22 can thus meet the above-mentioned requisite. In addition, the reference section 22 is arranged at a position which is separated from the tip of the lever section 202 only by the distance (d). As seen in the cases of the above-described micro-cantilevers, therefore, the measuring light beam Lm is shot onto the tip of the lever section 202 while the reference light beam Lr is shot onto the reference section 22. Further, the reference section 22 is made lower than the top of the lever attaching section 215 so as to prevent the spot shape of the reference light beam collected on the reference section 22 from becoming largely different from that of the measuring light beam collected on the tip of the lever section 202. When the micro-cantilever whose lever section 202 is different in length is to be made, the length (k) of that area of the lever section 202 which is covered by the reference section 22 and the like is changed while keeping certain a distance (h) which extends from the tip of the lever section 202 to the reference section 22. Depending upon samples to be measured and the measuring manner conducted by the probe microscope of the scanning type, it is desirable that level difference between the lever section 202 and the reference section 22 is set at a range of 100 nm to several 10 nm.

Figure 17B:
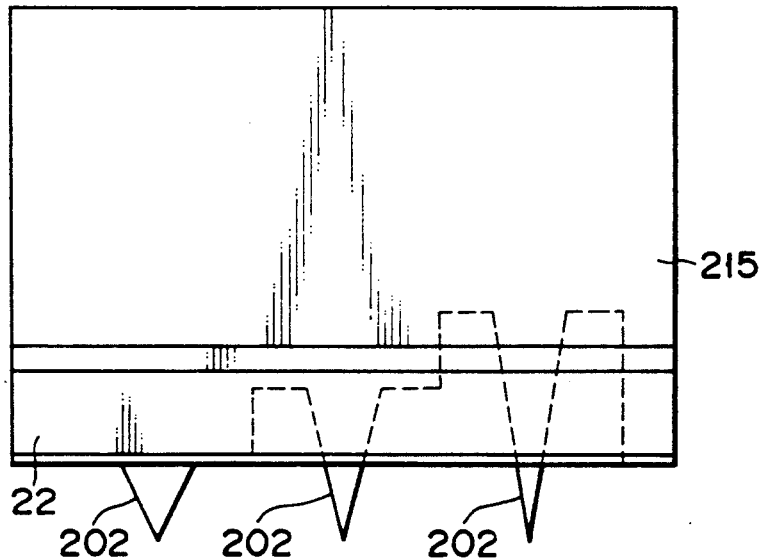

A still further micro-cantilever provided with plural lever sections 202, different in length, is shown in FIG. 17B. The distance from the tip of the lever section to the reference section 22 is the same but the length of that area of the lever section which is covered by the reference section 22 and the like is different in each of the lever sections 202. When a micro-cantilever having the same function is to be made, it is imagined that the micro-cantilever support section is processed to align the bases of the lever sections with one another, but when arranged as shown in FIG. 17B, it is more advantageous in that the volume of that portion of the lever attaching section to which fine patterning is applied is smaller.

Figure 18:
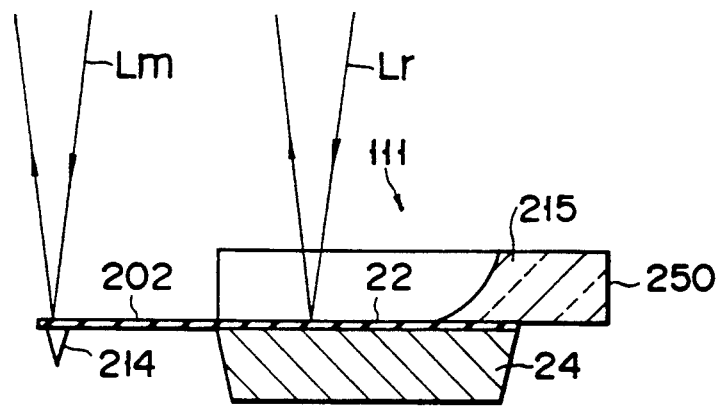
FIG. 18 shows a still further type of cantilever.

A still further micro-cantilever suitable for the heterodyne method is shown in FIG. 18. In the case of this micro-cantilever 111, the lever section 202, the probe 214, the lever attaching section 215 and others are similar to those of the micro-cantilever shown in FIG. 13B but the process of making the micro-cantilever 111 shown in FIG. 18 is different. Glass is bonded to the lever attaching section 215, the lever and reference sections 202 and 22 are made of silicon nitride, and a part 24 located under the reference section 22 is made of silicon. The glass at the lever attaching section 215 is bonded to silicon or silicon nitride by the anode bonding method. It is advantageous in the case of this micro-cantilever 111 that the reference section 22 is quite strong against vibration applied from outside. The micro-cantilever 111 may be made in such a way that the lever attaching section 215 is made of silicon and that the reference section 22 or the part 24 located under the reference section 22 is made of glass.

Manufacturing method practically conducted by applicants will be described below. An Si wafer was washed clean and $Si_3N_4$ was deposited, 150 nm thick, on the wafer according to the CVD. In order to form a probe on the etched Si as a replica, a hole of 5 um square was formed in the $Si_3N_4$ by lithography and anisotropic etching was then applied to the Si, using the solution of potassium hydroxide, to form a hole of the square cone type in the Si. The $Si_3N_4$ was once removed by the plasma etching and $Si_3N_4$ was again deposited, 500 nm thick, on the whole of the surface of the Si, which includes the square-cone-shaped hole, by the CVD. It was further annealed in water vapor of 1100° C. to add SiO$_2$ a little on the Si$_3$N$_4$ and then exposure-patterned by lithography to form micro-cantilevers. While doing so, grooves for cutting off the micro-cantilevers from one another, grooves for serving not to bond pilex glass (coning #7740) to the micro-cantilever section and grooves for forming the opening at the reference section were made by the dicing saw before the pilex glass was anode-bonded to the Si wafer. The Si wafer and the pilex glass were bonded to each other by the anode bonding technique and the cantilevers were cut off from one another by running the dicing saw on the backside of the wafer along the grooves. Each of the cantilevers was thus made.

As described above, semiconductor materials in which Si is typical, and compounds derived from these semiconductor materials are often used as materials of which the micro-cantilever is made, because the cantilever is produced according to the process of manufacturing semiconductor ICs. The micro-cantilever support section and the reference section may be made by bonding glass or the like to Si according to the anode bonding technique and glass or the like is therefore often used as material of which the cantilever of this type is made.

Because displacements of the lever section and the reference section are optically caught and the reflection factor of light at each of the sections determines the accuracy of measurements conducted, it is desirable that these sections are made of the same material to make their reflection factors equal to one another and that reflective coating is applied to the lever section and the reference section, considering those materials of which these sections are made.

The micro-cantilever thus made is suitable for the probe microscope of the scanning type into which the displacement measuring system according to the heterodyne method is incorporated. Any cantilever whose lever section is different in length from the one which has been used with the probe microscope of the scanning type can be used with the microscope without adding any adjustment to the microscope because measurement is conducted while selecting the mechanical resonance frequency and the spring constant. Therefore, the time needed to adjust the microscope before measurement can be extremely shortened to thereby make it possible to obtain data at a short time period. The above-described cantilever is made using the semiconductor ICs process. Therefore, it can be made with a high accuracy of micron millimeter order and with a more excellent reproductiveness. When it is made by the batch process, its cost can be reduced.

In the case of the micro-cantilever made as described above, the distance from the struck face of the lever attaching section to the tip of the micro-cantilever can be kept as the result of positioning them, with a high accuracy, as seen in the cases of the above-described cantilevers. The micro-cantilever attached to the lever seat 109 in this case can be easily exchanged with another one in the probe microscope of the scanning type. Further, the chip seat, the lever seat and the cantilever are positioned with an extremely high accuracy, thereby enabling the cantilever to be attached to its original position with a high accuracy.

Figure 19A:
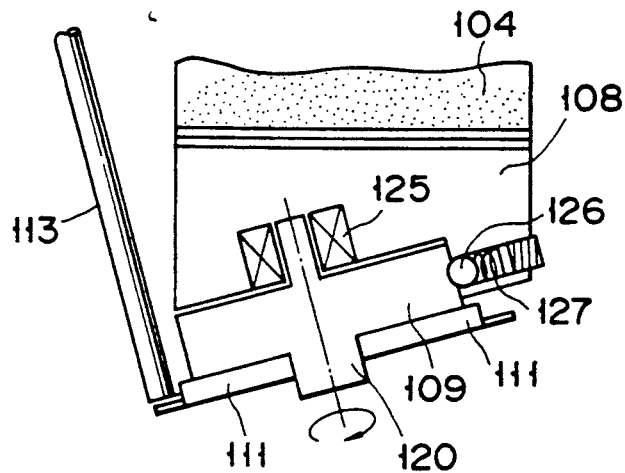
Figure 19B:
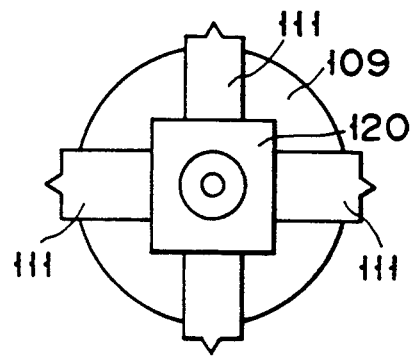

FIGS. 19A and 19B show a case where plural micro-cantilevers used by the cantilever unit of the present invention are attached to the lever seat 109. The lever seat 109 is shaped like a disk and attached rotatably to the chip seat 108. It is also rotatably supported by a bearing 125 and locked at a predetermined position by a click ball 126 and a spring 127. It has a square projection 120 projected from its center. Each of four micro-cantilevers 111 is attached to each of four sides of the projection 120, directing in the radial direction of the lever seat 109. These micro-cantilevers are fixed to their corresponding sides of the projection 120 by the same manner as in the cases of the above-described cantilevers. Each of the micro-cantilevers 111 and the lever seat 109 are therefore positioned with high accuracy.

When arranged in this manner, the micro-cantilevers can be exchanged with others, while keeping them attached to the lever seat 109. When the revolving system is employed, the cantilevers can be exchanged with others by detaching the projection 120 by the revolving system. This means that the micro-cantilevers fixed to their corresponding sides of the projection 120 can be exchanged with others without exchanging the lever seat 109 with a new one. The probe microscope can therefore be used with ease.

According to the present invention as described above, the striking sections are formed at the micro-cantilever by the lithography techniques and bonded to the struck faces of the lever seat to make the micro-cantilever and the lever seat integral to each other. This makes it possible to exchange the micro-cantilever with another one while keeping it attached to the lever seat. The exchange of the micro-cantilever with another one can thus be made with extreme ease. Further, the cantilever unit can be made according to the lithography techniques and the like. Therefore, the cantilever unit can be positioned with a higher accuracy and the cantilever can be more accurately attached to its original position with a higher reproductiveness.

The cantilever made as described above can be applied to other force microscopes such as the magnetic force microscope and to almost all of the atomic microscope including the STM.

The AFM device shown in FIG. 1 is intended to use the micro-cantilever of low rigidity and catch the micro-cantilever which is displaced corresponding to a sample through the optical displacement meter which includes the optical fiber. If the micro-cantilever which has high rigidity and to which the conductivity process is applied is used in this case, the STM can be made operative while catching tunnel current flowing between the micro-cantilever and the sample. The micro-cantilever of the present invention can be attached to this STM with extreme ease.

Further, the present invention can be applied to the STM (or Micro STM) of a new cantilever type which was disclosed in a lecture (S10-Number 2) "Micro-fabrication of Integrated Scanning Tunneling Micro-scope" (4th International Conference on Scanning Tunneling Microscopy/Spectroscopy: Jul. 9-14, 1989) made by T. R. Albrecht, S. Akamine, M. J. Zdeblick and C. F. Quate and to which actuator function is added. The exchange of the cantilever with another one can be made easier in this case, too, and a higher reproductiveness of data before and after the exchange of the cantilever can be achieved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A cantilever unit for use in an atomic probe microscope, comprising:
   a replaceable cantilever including a lever section having a probe, and a supporting block for supporting the lever section, said supporting block having first and second attachment sections; and
   a lever seat for removably receiving and supporting the cantilever, said lever seat having a first face in contact with said first attachment section and a second face in contact with said second attachment section when the cantilever is received and supported on the lever seat, said first and second faces being at an angle relative to each other, and said first and second attachment sections of said supporting block are arranged at an angle relative to each other; and
   wherein said first attachment section has a border ridge arranged to contact said first face of said lever seat when the cantilever is received and supported on the lever seat.

2. A cantilever unit according to claim 1, wherein the first face is vertical relative to a direction where the lever section is projected from the supporting block, and said second face is parallel to the projection direction of the lever section.

3. A cantilever unit according to claim 1, wherein said supporting block has a third attachment section, and the lever seat has a third face in contact with the third attachment section when the cantilever is received and supported on the lever seat.

4. A cantilever unit according to claim 3, wherein said third face is perpendicular to said first and second faces.

* * * * *